Nov. 8, 1955 D. W. BARKLEY 2,722,864
REVERSIBLE REAR VIEW MIRROR
Original Filed May 27, 1949 2 Sheets-Sheet 2
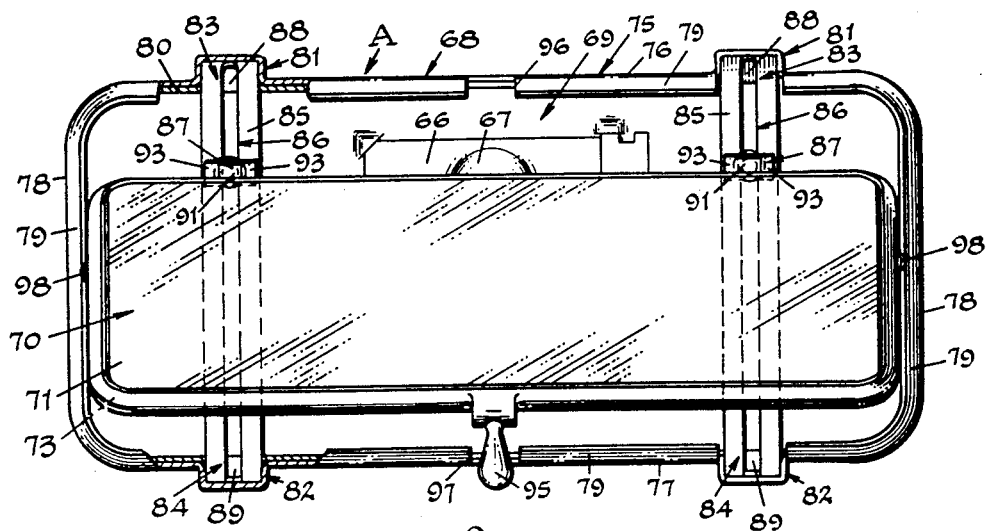
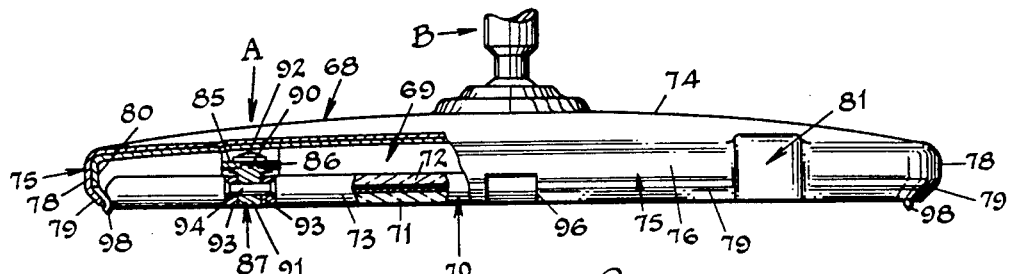
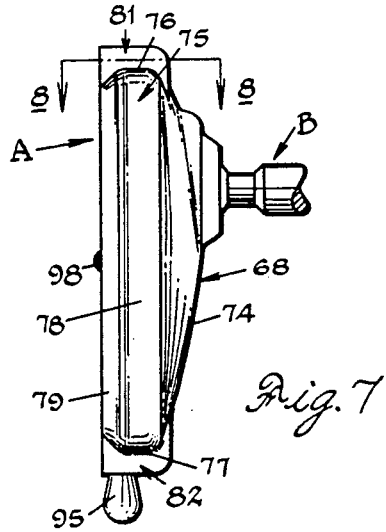
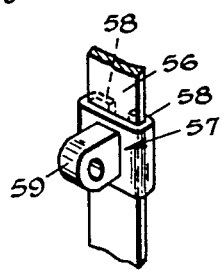
Inventor
Dwight W. Barkley
By Nobbe & Swope
Attorneys

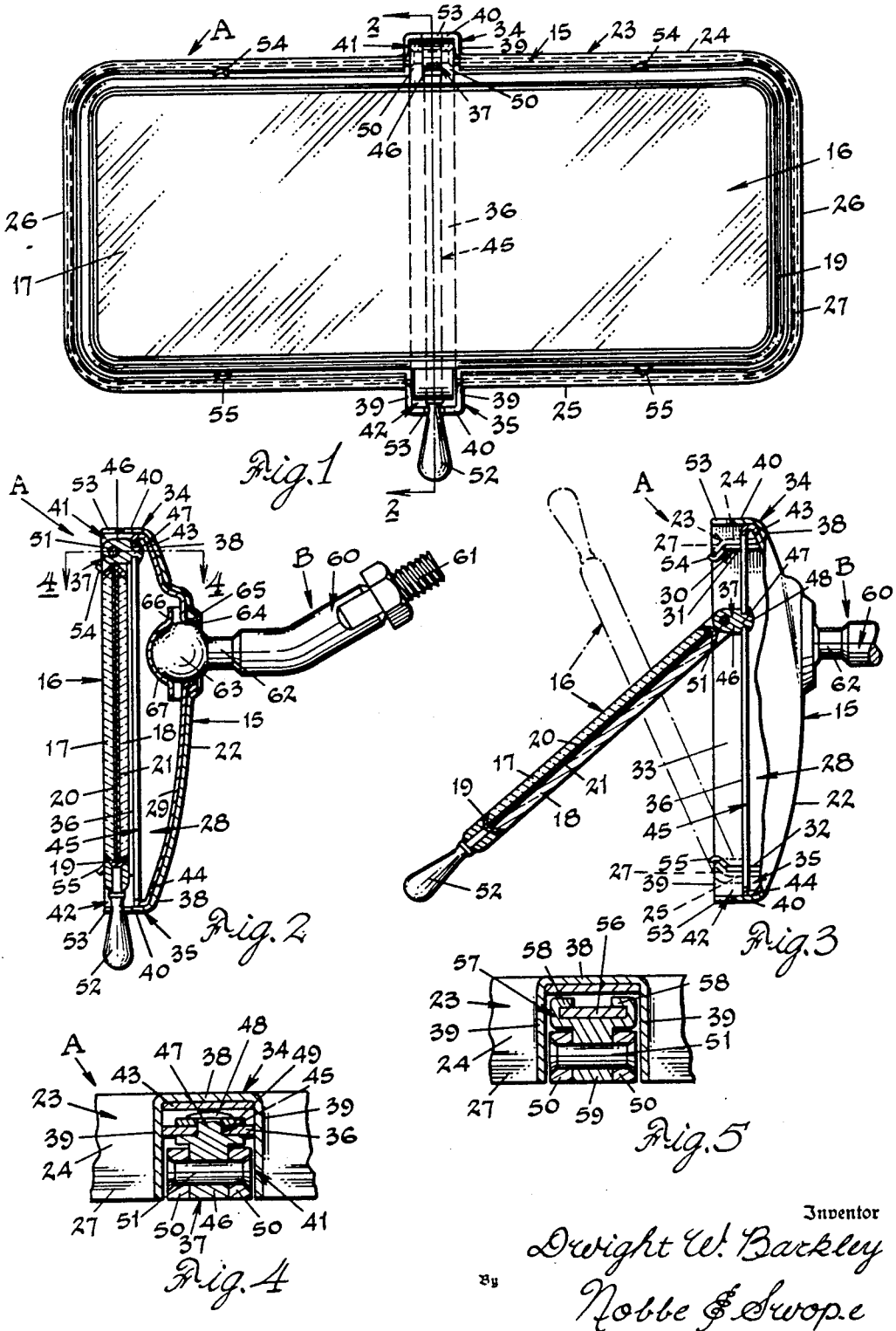

United States Patent Office 2,722,864
Patented Nov. 8, 1955

2,722,864

REVERSIBLE REAR VIEW MIRROR

Dwight W. Barkley, New Kensington, Pa., assignor to Libbey-Owens-Ford Glass Company, Toledo, Ohio, a corporation of Ohio Continuation of abandoned application Serial No. 95,742, May 27, 1949. This application December 9, 1953, Serial No. 397,079

6 Claims. (Cl. 88—77)

The present invention relates to rear view mirrors, such as are employed in automobiles and the like, of the character which enables the driver of the vehicle to have a clear view of the rear road conditions at all times.

This application is a continuation of my copending application Serial No. 95,742, filed May 27, 1949, now abandoned.

More particularly, this invention has to do with that type of rear view mirror having two surfaces of different reflectivity and being reversible so that either surface may be brought into operative position by the driver of the vehicle; one reflective surface being preferably in the form of an ordinary mirror for use in day driving and the other providing a mirror for night driving which will reduce the brilliancy of the reflecting headlights of an automobile approaching from the rear.

It is an aim of this invention to provide a rear view mirror of the above type embodying means of a novel and improved character which will enable the driver to reverse the mirror in a rapid, efficient manner and with a minimum of care and attention on his part.

Another object of the invention resides in the provision of a rear view mirror embodying a supporting housing or case with which the mirror proper is both hingedly and slidably associated so that it is capable of being readily reversed to selectively bring either of the reflecting surfaces into the line of vision of the driver, depending upon whether the mirror is to be used for day driving or night driving.

Another object of the invention is the provision of a rear view mirror embodying a case, the front of which is open, and a pivotally mounted reversible mirror unit closing the front of the case when in normal operative position, means being provided to effectively maintain the mirror in viewing position, and cooperating means on the case and mirror unit for guiding the mirror unit during reversal thereof.

A further object of the invention is the provision of a rear view mirror assembly embodying a case within which the mirror unit is mounted for both bodily reciprocal and pivotal movement, the several parts of the assembly being so associated with one another as to provide a simple, compact arrangement which may be easily actuated by the driver of the vehicle to effect reversal of the mirror unit relative to the case.

A still further object of the invention is the provision of a rear view mirror assembly of the above character in combination with means for supporting the same upon the structure of a vehicle for bodily adjustment relative to its supporting structure to bring the mirror unit into any desired angular position to accommodate persons of different height and seating position.

Other objects and advantages of the invention will become more apparent during the course of the following description, when taken in connection with the accompanying drawings.

In the drawings, wherein like numerals are employed to designate like parts throughout the same:

Fig. 1 is a front elevtaion of a rear view mirror constructed in accordance with the invention;

Fig. 2 is a vertical transverse section taken on line 2—2 of Fig. 1;

Fig. 3 is a similar vertical transverse section but showing the mirror unit in partially reversed position;

Fig. 4 is a horizontal detail section taken on line 4—4 of Fig. 2;

Fig. 5 is a similar horizontal detail section illustrating a modified form of support for the mirror unit;

Fig. 6 is a front elevation of a modified form of rear view mirror embodying the invention;

Fig. 7 is an end view thereof;

Fig. 8 is a horizontal longitudinal section taken substantially on line 8—8 of Fig. 7; and Fig. 9 is a perspective view of the supporting structure shown in Fig. 5 which may be employed in either the preferred or modified forms of rear view mirror.

Referring now to the drawings and particularly to that form of the invention illustrated in Figs. 1 to 4 inclusive, there is shown a rear view mirror which is designated in its entirety by the letter A. The mirror assembly A generally comprises a case 15, adjustably supported within an automobile or the like by a mounting means B, and carrying a reversible mirror unit 16.

Although the invention is not limited to the use of any specific type of reversible mirror unit 16, it may be composed, as herein shown by way of example, of two mirror elements 17 and 18 arranged in back to back relation and mounted in a bezel 19. The mirror elements 17 and 18 have their inner, adjacent surfaces provided with reflective coatings 20 and 21 respectively, of different reflecting values, with one mirror coating being highly reflective and suitable for daytime driving and the other mirror coating having a lower reflecting value suitable for night-time driving. The mirror unit 16 is both slidably and pivotally associated with the case 15 in such a manner that either mirror element 17 or 18 may be selectively brought by the driver of the vehicle into operative position in his line of vision.

The case 15 is preferably rectangular in outline and comprises a rear wall 22 which is curved both longitudinally and transversely. The rear wall 22 is also formed with a forwardly bent peripheral flange 23 defining a top wall 24, bottom wall 25 and opposite end walls 26, the flange 23 being generally bent inwardly along its marginal edges to provide an angularly disposed front wall 27.

Received within the case 15 is a liner plate 28 which is formed to closely approximate said case, conforming to the contour of its interior so as to interfit snugly therewith. More particularly, the liner plate 28 comprises a rear wall 29 and a forwardly bent peripheral flange 30 which are so located that the rear wall of the liner plate is in contact with the case rear wall 22, while the top wall 31, bottom wall 32, and end walls 33 of the peripheral flange 30 are in contact with the corresponding top wall 24, bottom wall 25 and end walls 26 of the case. Throughout the major portion of its marginal edge, the liner plate flange 30 is firmly engaged by the inner surface of the front wall 27 of the case to secure the liner plate in place within the case.

The case 15 is provided, intermediate its ends and at the upper and lower edges thereof, with rectangularly shaped housings 34 and 35 respectively in which are located the opposite ends of a vertical guide bar 36 upon which is slidably mounted a traveler 37 to which the mirror unit 16 is pivotally connected. Each housing 34 and 35 is composed of a rear wall 38 extended outwardly from the respective top or bottom edge of the case, opposite side walls 39 and an end wall 40. These walls thus cooperate to define forwardly opening recesses 41 and 42 respectively in which the traveler 37 is received at each end of its vertical movement along the guide bar 36.

The guide bar 36 may consist of a flat, elongated piece of metal supported within the housings 34 and 35 and having the opposite ends thereof suitably secured to tongue extensions 43 and 44 of the liner plate 28. As herein shown, however, the guide bar is formed integral with the tongue 43 and is bent downwardly with its lower end suitably attached to the opposite tongue 44. The guide bar also is preferably provided with a longitudinally extending slot 45 in which the traveler 37 is slidably mounted.

The traveler 37 comprises a body portion 46 having a reduced shank 47 which extends through the slot 45 in guide bar 36 and has an enlarged upset head 48 spaced from the bar by a bearing washer 49. The mirror unit 16 is pivotally connected to the body portion 46 of the traveler by spaced lugs 50 secured to the bezel, said lugs being disposed at opposite sides of the body portion 46 and secured thereto by a pivot pin 51.

Carried by the bezel 19 of the mirror unit, opposite the traveler 37, is an operating handle 52 suitably secured thereto and by means of which the mirror unit may be easily and quickly reversed at will by the driver of the vehicle. Thus, by means of the handle 52, the mirror unit 16 may be swung relative to the traveler 37 and simultaneously moved along the guide bar 36 between the housings 34 and 35. When the mirror unit is in normal viewing position with respect to the case, the operating handle 52 will be received in the notches 53 provided in the end wall 40 of the housing 34 or 35 as will be more fully hereinafter described.

When the mirror unit 16 is located within the case 15 to bring either the mirror element 17 or 18 into operative viewing position as shown in Figs. 1 and 2, it is secured in such position by pairs of retaining clips 54 and 55 which are arranged so as to resiliently grip the upper and lower edges of the bezel 19. The clips 54 and 55 are formed as extensions from the top wall 31 and bottom wall 32 of the liner plate 28 and project forwardly from the case to engage said bezel and snap over the edges thereof as the mirror unit is swung toward and away from the case.

In operation, and assuming the mirror element 17 is located in operative viewing position, as shown in Fig. 2, and it becomes desirable to replace it by the mirror element 18, the driver of the vehicle need simply grasp handle 52 and pull the same forwardly from the notch 53 in the lower housing 35 to overcome the gripping influence of the clips 55. Then, and since the traveler 37 is freely slidable within the vertical slot 45 in guide bar 36, the said traveler will descend to the lower extremity of the slot, as shown by broken lines in Fig. 3. Since the weight of the mirror unit 16 is sufficient to carry the traveler downwardly, the driver actually need only pull the mirror unit 16 outwardly from the case and control the rate of descent of the traveler by means of the handle 52.

During the downward movement of the traveler 37, the hinge connection afforded by the pivot pin 51 permits the mirror unit 16 to gradually swing radially in a clockwise direction, and when the traveler reaches the limit of its downward movement, the said mirror unit can be easily swung upward toward the case 15. The mirror elements 17 and 18 are now reversed and will be held in such position when the handle 52 is pushed into the notch 53 of the upper housing 34 and the clips 54 are snapped over the upper edge of the bezel. When it becomes desirable to again reverse the mirror elements, the mirror unit is swung outwardly by means of the handle 52, substantially as shown by the broken lines in Fig. 3. The mirror unit is then turned in a counterclockwise direction on the pivot pin 51 and, by applying an upward thrust thereto, the traveler 37 will be caused to ascend in the slot 45. At the end of its upward movement, the traveler 37 will be received in the upper housing 34 and the mirror unit swung inwardly until the handle 52 is received in the lower notch 53. At such time, the mirror element 17 will again be brought into viewing position and supported firmly therein by the retaining clips 55 which engage the bezel.

Another important feature of the rear view mirror herein provided is that the rear wall 22 of the case acts as a cover for the mirror surface facing said rear wall to shield the same from the headlights of oncoming vehicles and thereby prevent incidental reflections in the windshield of the vehicle created by oncoming traffic. Thus, the out-of-vision reflecting surface is normally in a position to receive light rays that may originate in approaching car lights, sunlight, and reflections from either source. These light rays can and will, unless the mirror is shielded therefrom, be reflected back toward the windshield of the vehicle and create disturbing sources of conflicting light or areas of scattered light therefrom which may materially interfere with driving safety and comfort. The rear wall 22 of the case in serving as a cover for the adjacent reflecting surface of the mirror prevents such incidental reflections.

The form of traveler support, as afforded by the slot 45 in the guide bar 36, may be modified, if desired, as shown in Figs. 5 and 9. This modification involves the use of a guide bar 56 which replaces the bar 36 and a suitably bent channel member 57 which engages the opposed marginal edges of the bar by means of the inwardly bent ends 58. The channel member 57 is carried by a body portion 59, similar to the body portion 46 of the traveler 37, which is received between the lugs 50 of the bezel 19 and connected thereto by the pivot pin 51.

Preferably, the mirror assembly A is supported within an automobile or the like in such a manner that it can be bodily adjusted to any desired angular position to reflect images from the rear of the vehicle to the driver according to his height and seating position. The mounting means B herein shown is one form of adjustable mounting which may be used for this purpose, and comprises an arm 60 which is secured to the framing structure of an automobile by means of its threaded shank 61. Opposite this threaded shank, the arm 60 is provided with a shank 62 of reduced diameter which terminates in a spherical or ball end 63. The shank 62 of the arm extends through an opening 64 in the rear wall 22 of the case and the ball end 63 is mounted in a spherical bearing or seat 65 formed in the liner plate 28. The ball end is retained in this seat by a metal strap 66 having a centrally formed bearing surface 67 conforming to and engaging said ball. The metal strap 66 may be suitably secured at its opposite ends to the liner plate and coacts with the bearing seat 65 to grip the ball 63 with sufficient force to maintain the mirror assembly stationary except when it is adjusted bodily upon the said ball.

While the above described construction has been found to be very satisfactory for quickly and easily reversing the mirror unit 16 to present the desired mirror element 17 or 18 to the driver, it is possible to increase the stability of the pivotal interconnection between the bezel 19 and case 15 by adding a second guide bar as illustrated in Figs. 6 to 8 inclusive. As therein shown, the modified mirror assembly A is adjustably supported by the mounting means B. This mirror assembly also comprises a case 68, a liner plate 69 received therein, and a mirror unit, designated generally at 70, and which consists of the mirror elements 71 and 72 carried in a bezel 73. In Fig. 6, the mirror unit 70 is shown as having been partially moved to reverse the mirror elements and its relative position with respect to the case is substantially as shown in Fig. 3.

The case 68 is substantially rectangular and comprises an arcuate rear wall 74 and a forwardly bent peripheral flange 75 including a top wall 76, bottom wall 77 and opposite end walls 78. The flange 75, throughout its wall portions, has inwardly bent marginal edges which form a relatively narrow front wall 79 bounding the open side of the case and engaging, along its inner surface, the peripheral flange 80 of the liner plate 69 to retain the same within the case 68.

Equally spaced inwardly from the end walls 78, the case is provided in its top wall 76 with the two housings 81, and two similar housings 82 are formed in the bottom wall 77 of the case in alignment with the housings 81. The pairs of housings 81 and 82 define recesses 83 and 84 respectively in which the opposite ends of the guide bars 85 are secured, said bars having slots 86 along which the travelers 87 may be reciprocally moved. As previously set forth, the bars 85 may be formed from or fixedly secured at their opposite ends to tongue extensions 88 and 89 on the liner plate.

The travelers 87 are moved along and maintained in slidable relation with the slots 86 by shanks 90 which are integrally formed with the traveler body portions 91. The shanks 90 are upset to provide enlarged upset heads 92 for maintaining the body portions against the guide bars 85. The body portions 91 of the travelers are disposed between pairs of spaced lugs 93 secured to the bezel 73 and the lugs 93 are pivotally supported on their related traveler body 92 by pivot pins 94.

The bezel 73 of mirror unit 70 is provided with a handle 95 located midway between its ends and by which the unit can be readily actuated by the driver. When the mirror unit is located in closed position with respect to the case, the handle is received in notches 96 or 97 formed in the top wall 76 and bottom wall 77 respectively of the case, depending upon the mirror element which is presented to the driver. Preferably, the mirror unit is retained in its closed position by clips 98, in a similar manner to the clips 54 and 55 previously described. The clips 98 are located so as to snap over the end edges of the bezel 73, when the mirror unit is withdrawn from or returned to the case, and may consist of extensions of the flange 80 of the liner plate 69.

When it is desired to reverse the mirror elements, the mirror unit 70 is swung bodily outwardly with respect to the case 68. The hingedly and slidably supported side of said unit will then descend, by reason of its weight, or be manually thrust upward by the driver as the travelers 87 move within the slots 86 in guide bars 85, in the same manner as described in detail hereinabove in connection with that form of the invention illustrated in Figs. 1 to 4.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a rear view mirror for automobiles and the like, a supporting case including a rear wall provided with mounting means therefor and being open at the front thereof, a mirror unit in a position normally closing the front of the case and having two oppositely facing reflective surfaces of different reflecting values, a substantially vertical guide member carried by said case, traveler means freely slidable along said guide member, and means for pivotally connecting the mirror unit to said traveler means so that as the said traveler means moves bodily along the guide member the mirror unit can be simultaneously pivoted thereon to effect the reversal and return thereof to the same position relative to the case for normally closing the front of said case and thereby present the desired reflecting surface to the driver.

2. In a rear view mirror for automobiles and the like, a supporting case including a rear wall provided with mounting means therefor and being open at the front thereof, a mirror unit in a position normally closing the front of the case and having two oppositely facing reflective surfaces of different reflecting values, a substantially vertical guide member carried by said case, traveler means freely slidable along said guide member and including a body portion, and means pivotally connecting the mirror unit at one side thereof to said body portion to swing freely about a substantially horizontal axis, so that as the traveler means moves in one direction along the guide member, the mirror unit can be simultaneously swung in the opposite direction to effect the reversal and return thereof to the same position relative to the case for normally closing the front of said case and thereby present the desired reflecting surface to the driver.

3. In a rear view mirror for automobiles and the like, a supporting case including a rear wall provided with mounting means therefor and being open at the front thereof, a mirror unit in a position normally closing the front of the case and having two oppositely facing reflective surfaces of different reflecting values, a substantially vertical guide member carried by said case, traveler means freely slidable along said guide member and including a body portion, means pivotally connecting the mirror unit at one side thereof to said body portion to swing freely about a substantially horizontal axis, so that as the traveler means moves in one direction along the guide member, the mirror unit can be simultaneously swung in the opposite direction to effect the reversal and return thereof to the same position relative to the case for normally closing the front of said case and thereby present the desired reflecting surface to the driver, and means carried by the case and engaging the mirror unit for maintaining the latter in normal viewing position.

4. In a rear view mirror for automobiles and the like, a supporting case including a rear wall provided with mounting means therefor and being open at the front thereof and having outwardly extended housings at the upper and lower edges thereof, a mirror unit in a position normally closing the front of the case and having two oppositely facing reflective surfaces of different reflecting values, a vertical guide member mounted within the case and having its opposite ends secured within said housings, traveler means slidable freely along said guide member and including a body portion, and means pivotally connecting the mirror unit at one side thereof to said body portion to swing freely about a horizontal axis, the parts being so associated with one another that as the traveler means slides along the guide member in one direction, the mirror unit can be simultaneously pivoted in the opposite direction with respect thereto to effect the reversal and return of the mirror unit to the same position relative to the case for normally closing the front of said case and thereby present the desired reflecting surface to the driver, the said traveler means being received within the said housings when at the limit of its vertical movements.

5. In a rear view mirror for automobiles and the like, a supporting case including a rear wall provided with mounting means therefor and being open at the front thereof and having outwardly extended housings at the upper and lower edges thereof, a mirror unit in a position normally closing the front of the case and having two oppositely facing reflective surfaces of different reflecting values, a vertical guide member mounted within the case and having its opposite ends secured within said housings, traveler means slidable freely along said guide member and including a body portion, means pivotally connecting the mirror unit at one side thereof to said body portion to swing freely about a horizontal axis, the parts being so associated with one another that as the traveler means slides along the guide member in one direction, the mirror unit can be simultaneously pivoted in the opposite direction with respect thereto to effect the reversal and return of the mirror unit to the same position relative to the case for normally closing the front of said case and thereby present the desired reflecting surface to the driver, the said traveler means being received within the said housings when at the limit of its vertical movements, and means carried by the case and engaging the mirror unit for maintaining the latter in normal viewing position.

6. In a rear view mirror for automobiles and the like, a supporting case including a rear wall provided with mounting means therefor and being open at the front thereof, a mirror unit in a position normally closing the front of the case and having two oppositely facing reflective surfaces of different reflecting values, a guide member carried by said case, traveler means freely slidable along said guide member, and means for pivotally connecting the mirror unit to said traveler means so that as the said traveler means moves bodily along the guide member the mirror unit can be simultaneously pivoted thereon to effect the reversal and return thereof to the same position relative to the case for normally closing the front of said case and thereby present the desired reflecting surface to the driver.

References Cited in the file of this patent

UNITED STATES PATENTS

| | | |
|---|---|---|
| 1,625,011 | Wolfe et al. | Apr. 19, 1927 |
| 1,875,554 | Bell | Sept. 6, 1932 |
| 1,999,476 | Pollock | Apr. 30, 1935 |
| 2,087,531 | Sands | July 20, 1937 |